(12) United States Patent
Peisa et al.

(10) Patent No.: US 8,411,697 B2
(45) Date of Patent: Apr. 2, 2013

(54) METHOD AND ARRANGEMENT FOR IMPROVING MEDIA TRANSMISSION QUALITY USING ROBUST REPRESENTATION OF MEDIA FRAMES

(75) Inventors: Janne Peisa, Espoo (FI); Tomas Frankkila, Lulea (SE); Ingemar Johansson, Lulea (SE); Daniel Enström, Gammelstad (SE); Mats Sagfors, Kyrkslätt (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 327 days.

(21) Appl. No.: 12/278,493

(22) PCT Filed: Feb. 6, 2007

(86) PCT No.: PCT/SE2007/050071
§ 371 (c)(1),
(2), (4) Date: Aug. 6, 2008

(87) PCT Pub. No.: WO2007/091968
PCT Pub. Date: Aug. 16, 2007

(65) Prior Publication Data
US 2009/0245272 A1  Oct. 1, 2009

Related U.S. Application Data

(60) Provisional application No. 60/765,206, filed on Feb. 6, 2006.

(51) Int. Cl.
*H04L 12/54* (2006.01)

(52) U.S. Cl. ......... 370/428; 370/429; 714/748; 714/749

(58) Field of Classification Search .................. None
See application file for complete search history.

(56) References Cited

U.S. PATENT DOCUMENTS

| | | | | |
|---|---|---|---|---|
| 6,072,825 A * | 6/2000 | Betts et al. | | 375/222 |
| 6,381,228 B1 | 4/2002 | Prieto, Jr. et al. | | |
| 2003/0118031 A1* | 6/2003 | Classon et al. | | 370/395.54 |
| 2005/0021809 A1* | 1/2005 | Zhu et al. | | 709/231 |
| 2005/0022097 A1* | 1/2005 | Cheng | | 714/774 |

(Continued)

FOREIGN PATENT DOCUMENTS

WO  WO 2005/011188 A1  2/2005

OTHER PUBLICATIONS

Huang, et al., "Robust audio transmission over internet with self-adjusting buffer control," May, 8, 1998, Information Sciences, p. 8.*

*Primary Examiner* — Marsha D Banks Harold
*Assistant Examiner* — Anthony Sol (57) ABSTRACT

In a method of improved media frame transmission in a communication network. Initially a plurality of "original" or regular media frames are provided for transmission. According to the invention, robust representations of the provided regular media frames are generated and stored locally. Subsequently, one or more of the regular media frames is/are transmitted. The invention detects an indication of a loss of a transmitted media frame, and the idea is to transmit, in response to a detected frame loss, a stored robust representation of the lost media frame and/or a stored robust representation of a subsequent, not yet transmitted, media frame to increase the media quality.

10 Claims, 5 Drawing Sheets

U.S. PATENT DOCUMENTS

| | | |
|---|---|---|
| 2005/0137857 A1* | 6/2005 | Greer .............................. 704/201 |
| 2006/0088094 A1* | 4/2006 | Cieplinski et al. ....... 375/240.01 |
| 2006/0203821 A1* | 9/2006 | Mizusawa et al. ............ 370/392 |
| 2006/0252445 A1* | 11/2006 | Kim et al. ..................... 455/522 |
| 2007/0024559 A1* | 2/2007 | Ahn et al. ........................ 345/89 |
| 2008/0063116 A1* | 3/2008 | Yokoyama ..................... 375/299 |
| 2008/0089314 A1* | 4/2008 | Meyer et al. ................... 370/349 |
| 2010/0313096 A1* | 12/2010 | Lee ................................ 714/751 |

* cited by examiner

METHOD AND ARRANGEMENT FOR IMPROVING MEDIA TRANSMISSION QUALITY USING ROBUST REPRESENTATION OF MEDIA FRAMES

This application claims the benefit of U.S. Provisional Application No. 60/765,206, filed 2006 Feb. 6, the disclosure of which is fully incorporated herein by reference.

TECHNICAL FIELD

The present invention relates to transmission of media frames in communication systems in general, specifically to methods and arrangements for enabling improved transmission quality in response to packet loss in media (e.g. Voice IP) transmissions in WCDMA communication systems.

BACKGROUND

Wireless communication has undergone a tremendous development in the last decade. With the evolution and development of wireless networks towards 3 G-and-beyond, packet data services have been the major focus with the aim to provide e.g. higher bandwidth and accessibility to the Internet. Hence, protocols and network architectures including end user devices and terminals are normally designed and built to support Internet Protocol (IP) services as efficiently as possible.

For example, the technique of High Speed Packet Access (HSPA) enhances the Wideband Code Division Multiple Access (WCDMA) specification with High Speed Downlink Packet Access (HSDPA) in the downlink and Enhanced Dedicated Channel (E-DCH) in the uplink. These channels are designed to efficiently support Internet Protocol (IP) based communication by providing enhanced end-user performance and increased system capacity. Though originally designed for interactive and background applications, these channels provide as good or even better performance for conversational services than existing Circuit Switched (CS) bearers.

The E-DCH is a dedicated channel that has been enhanced for IP transmission, as specified in the standardization documents 3GPP TS 25.309 and TS 25.319. The enhancement primarily consists of:

- Possibility to use a shorter Transmission Time Interval (TTI)
- Use of fast Hybrid Automatic repeat ReQuest (HARQ) between the mobile terminal and the base station. The HARQ mechanism is semi-persistent, as it will abandon a transmission after a fixed number of transmission attempts. The actual number of attempts is determined and signaled from the radio network controller (RNC) to the user equipment (UE) or user terminal.
- Scheduling of the transmission rates of mobile terminals from the base station.

In addition, the E-DCH retains a majority of the features characteristic for dedicated channels in the uplink. Most importantly, as the uplink transmissions are not orthogonal, E-DCH is power controlled in order to avoid creating excessive interference that might make it impossible to detect other user's signals. The power control typically consists of two different mechanisms. First the so-called inner loop power control is performed for each ⅔ time slot. The transmitted power is adjusted so that the measured received signal strength of the Dedicated Physical Control Channel (DPCCH) reaches a predefined signal-to-interference ratio (SIR) target. This target is determined by the so-called outer loop power control, which tries to maintain a consistent block error rate for selected transmission attempts.

One group of conversational services can be referred to as Multimedia Telephone (MMTel). MMTel conversations typically consist of one or more media components, such as voice, video, or text components. The various component types typically have different priority. The voice component is usually considered most important, and thus it is important or even essential to try to preserve good voice quality even at the expense of the video and text components.

When using E-DCH, the interplay of the HARQ and power control can unfortunately result in application level packet losses for two basic reasons. First of all the control delay of the inner loop power control is 2 time slots. This delay is too long for transmission time intervals (TTI: s) of 2 ms duration that only consist of 3 time slots. Consequently, if the required power level changes significantly, the inner loop power control may not be able to adjust the power sufficiently. Second, the outer loop power control gradually lowers the SIR target until a block error occurs. This is problematic for the case of 10 ms TTI, for which the retransmissions take relatively long and thus the maximum number of retransmissions is low. Typically, this interaction with the HARQ and the power control result in the loss of one or a few enhanced Media Access Control (MAC-e) Protocol Data Units (PDU:s).

The loss of one or a few MAC-e PDU:s corresponds to the loss of one or a few application frames. Typically, most applications can recover from a single frame loss, but several consecutive packet losses can result in a noticeable impairment in the media quality.

There is therefore a need for methods and arrangements enabling an improved transmission quality for media transmissions where a packet or frame loss has been detected.

SUMMARY

According to a general aspect, the present invention provides media transmissions with improved quality.

According to a specific aspect, the present invention enables improved media transmission quality in response to a detected packet loss.

According to another specific aspect, the present invention enables improved VoIP transmissions in response to a detected packet loss in a WCDMA communication system.

Basically, the present invention provides a method of improved media frame transmission in a communication network. Initially a plurality of "original" or regular media frames are provided for transmission. According to the invention, robust representations of the provided regular media frames are generated and stored locally. Subsequently, one or more of the regular media frames is/are transmitted. The invention also detects an indication of a loss of a transmitted media frame, and the idea is to transmit, in response to a detected frame loss, a stored robust representation of the lost media frame and/or a stored robust representation of a subsequent, not yet transmitted, media frame.

Preferably, a robust representation of the lost media frame is transmitted when a frame loss is detected. Alternatively, after evaluation, it may be decided that it is actually better to transmit a robust representation of a new subsequent media frame.

Depending on the application and the circumstances, it may be desirable to transmit both a robust representation of the lost media frame together with a stored robust representation of a new subsequent media frame.

The invention is generally applicable for improving media quality over wireless communication channels, but especially suitable for enhancing conversational quality over E-DCH in the uplink and/or over HSDPA in the downlink.

Advantages of the present invention comprise:
improved media transmission quality;
improved system capacity;
improved E-DCH uplink and/or HSDPA downlink operation.

BRIEF DESCRIPTION OF THE DRAWINGS

The invention, together with further objects and advantages thereof, may best be understood by referring to the following description taken together with the accompanying drawings, in which.

ABBREVIATIONS

AMR Adaptive Multi-Rate
ARQ Automatic Repeat request
CS Circuit Switched
DPCCH Dedicated Physical Control Channel
E-DCH Enhanced Dedicated Channel
E-DPDCH Enhanced Dedicated Physical Data Channel
E-TFC Enhanced TFC
HARQ Hybrid ARQ
HSPA High Speed Packet Access
HSDPA High Speed Packet Data Access
IP Internet Protocol
MAC Medium Access Control
MAC-d MAC dedicated
MAC-e MAC enhanced
PDU Protocol Data Unit
RLC Radio Link Control
ROHC Robust Header Compression
SIR Signal to Interference Ratio
SDU Service Data Unit
TF Transport Format
TFC Transport Format Combination
TTI Transmission Time Interval
UE User Equipment
VoIP Voice over IP
WCDMA Wideband Code Division Multiple Access

DETAILED DESCRIPTION

The present invention will be described in the context of media transmissions, such as VoIP, on the uplink in a WCDMA system. However, it is equally possible to utilize the invention for the downlink.

The invention will mainly be described with reference to E-DCH and HSDPA, but the invention is not limited thereto.

For the purpose of this disclosure, a transmission is the first transmission of a particular protocol data unit (PDU) characterized by a sequence number or a corresponding identifier. The term retransmission refers to any further transmission related to the PDU with this sequence number. This includes retransmissions of the exact coded version of the PDU (e.g. with HARQ Type 1) as well as retransmissions of a new coded version of the PDU. The size of the retransmission may be the same or different from the first transmission. Furthermore, use the terms ARQ, ARQ protocol, etc will in the following in their general meaning, referring to ARQ and/or HARQ functionality.

Figure 1:
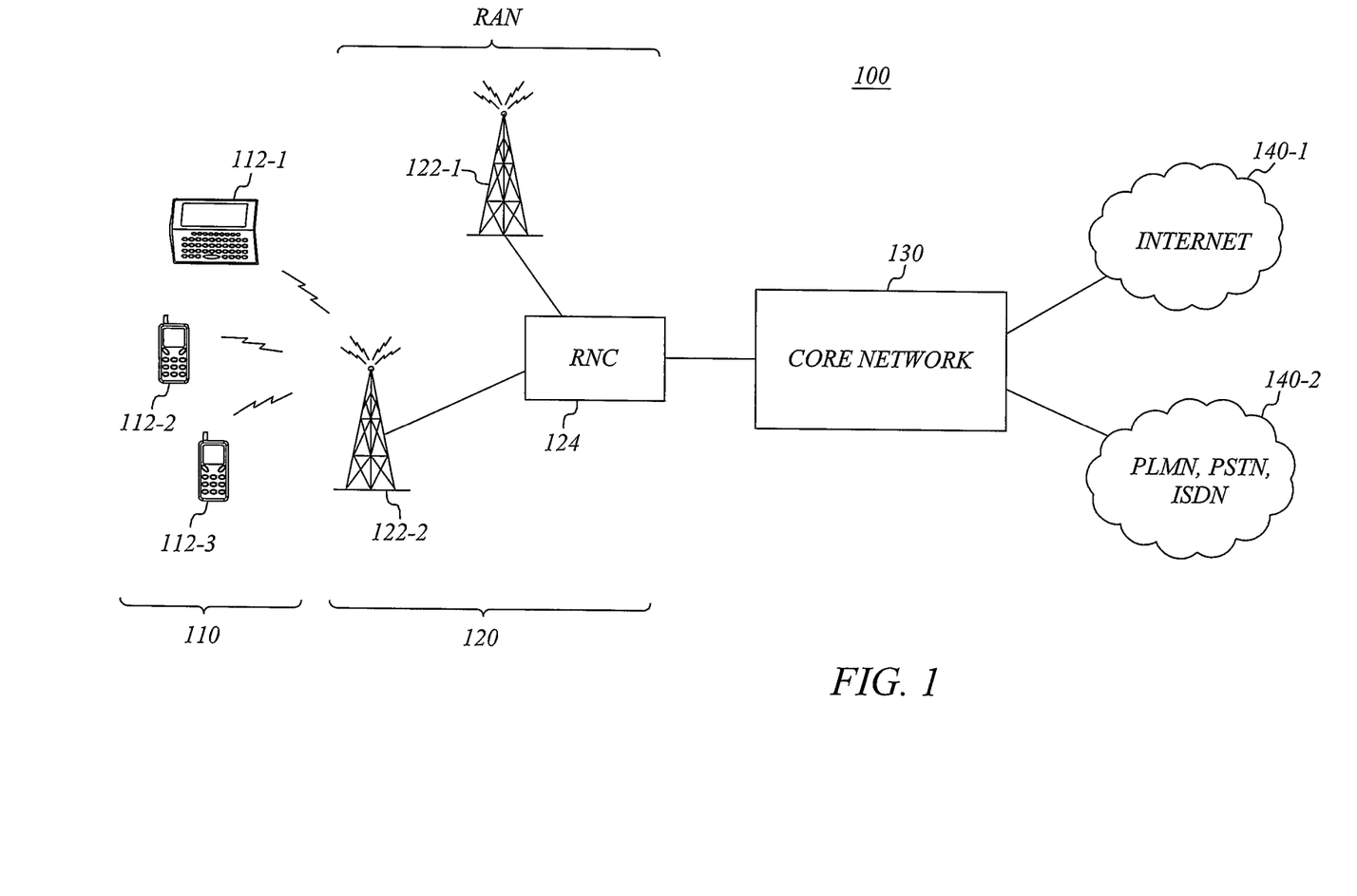
FIG. 1 is a schematic illustration of a communication system in which the present invention can be utilized.

FIG. 1 is a schematic overview of an example WCDMA communication system in which the present invention can be used. The illustrated system 100 comprises a Radio Access Network (RAN), e.g. a Universal Terrestrial Radio Access Network (UTRAN), and a core network 130. The RAN performs radio-related functions and is responsible for establishing connections between user equipment 112, such as mobile phones and laptops, and the rest of the network. The RAN typically contains a large number of Base Transceiver Stations (BTS) 122, also referred to as Node B, and Radio Network Controllers (RNC) 124. Each BTS serves the mobile terminals within its respective coverage area and several BTS are controlled by a RNC. Typical functions of the RNC are to assign frequencies, spreading or scrambling codes and channel power levels.

The RNC 124 provides access to the core network 130, which e.g. comprises switching centers, support nodes and databases, and generally some multimedia processing equipment. The core network communicates with external networks 140, such as the Internet, and Public Switched Telephone Networks (PSTN), Integrated Services Digital Networks (ISDN) and other Public Land Mobile Networks (PLMN). In practice, most WCDMA networks present multiple network elements and nodes arranged in much more complex ways than in the basic example of FIG. 1.

With the terminology used herein, the communication over a wireless communication link in a system like the illustrated packet-based communication system occurs from a transmitting side to a receiving side. In FIG. 1, this means that a PDU in an uplink scenario is sent from a transmitting side 110 comprising the user equipment (terminal) to a receiving side 120 comprising the Node B and the RNC. In a downlink scenario, on the other hand, the transmitting side 120 is the side of the radio access network with the Node B and the RNC, whereas the terminal belongs to the receiving side 110.

Figure 2:
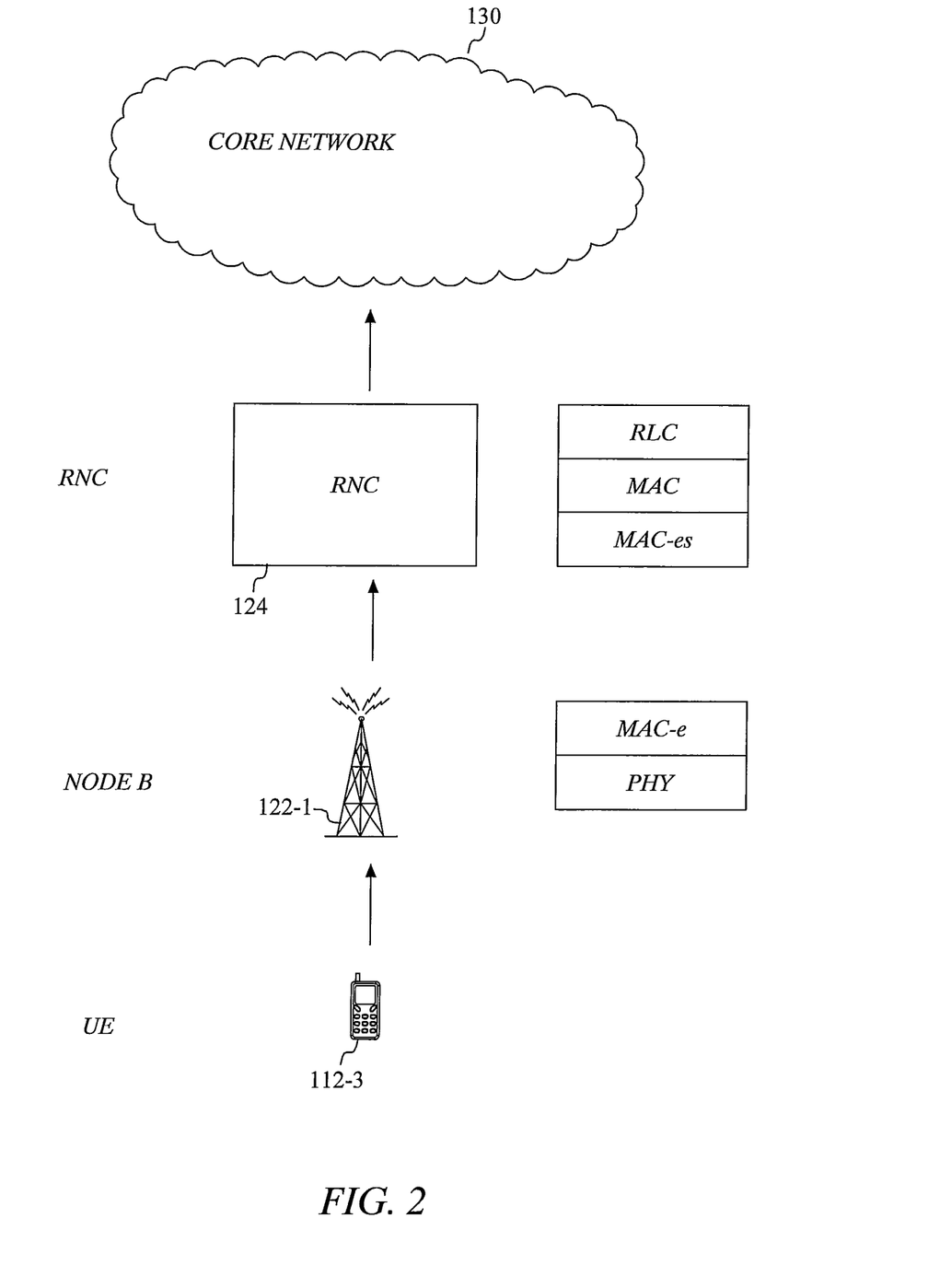
FIG. 2 is a schematic illustration of the protocol layers of a communication system in which the present invention can be utilized.

FIG. 2 illustrates schematically the most important protocol layers for the various entities regarding the E-DCH. To meet the requirements on low delays and rapid resource allocation for the enhanced uplink, the scheduling and hybrid ARQ (HARQ) must be located to the air interface. This is typically achieved with a Medium Access Control (MAC) entity (MAC-e) in the Node B. The MAC-e is responsible for scheduling and HARQ. The physical layer PHY is further enhanced to include the necessary functionality for soft combining. In addition, a MAC-e is included in the RNC to support in-sequence delivery, duplicate detection, and macro-diversity combining for the enhanced uplink.

As the main cause of MAC-e packet loss is exceeding the predefined number of retransmissions, the MAC-e entity knows immediately when a packet loss has occurred. Consequently, a general aim of the invention is to utilize the detection of an actual packet loss to enable an improved media transmission quality, in a sense to provide "repair" of the media.

Figure 3:
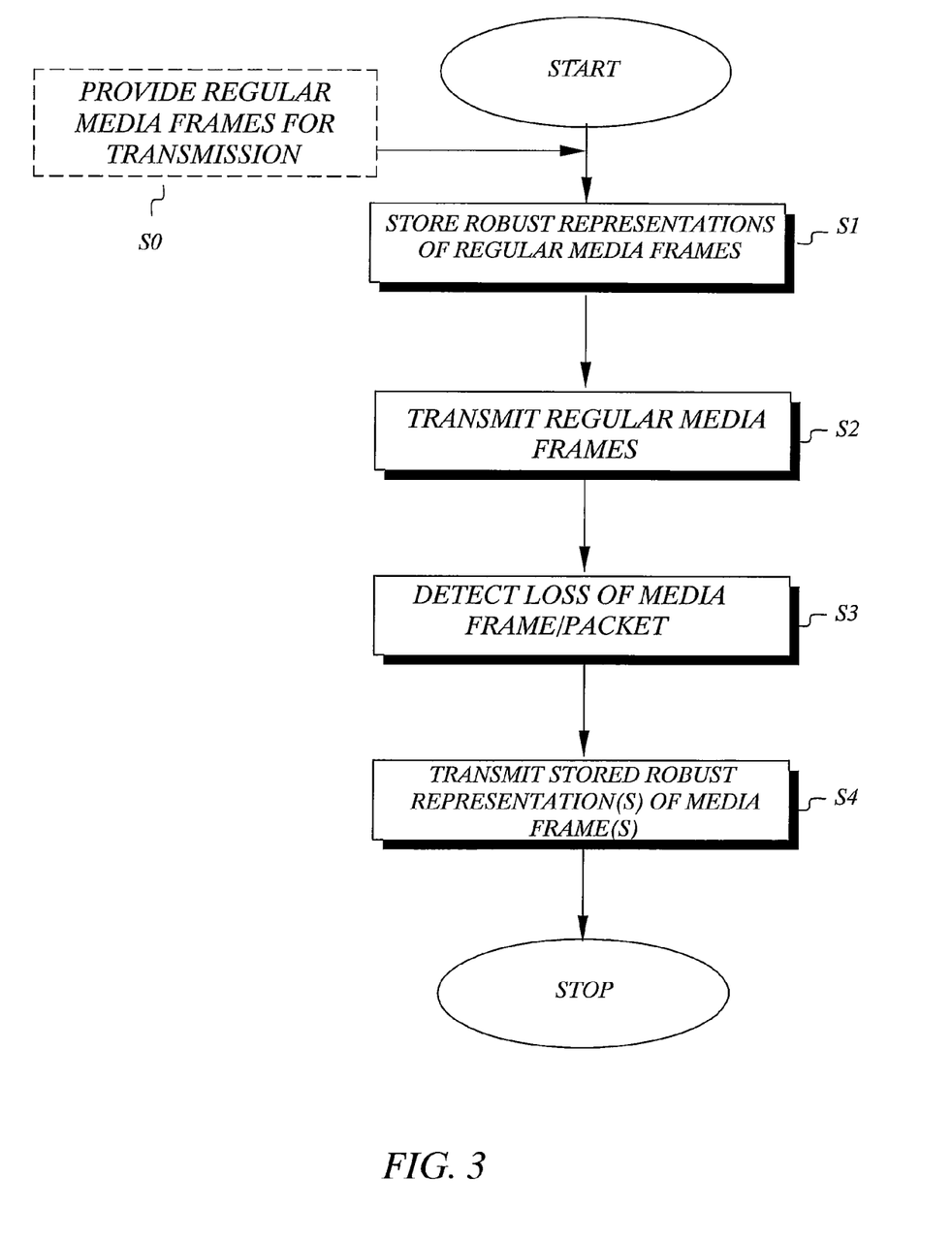
FIG. 3 is a schematic flow diagram of the basic steps of an embodiment of a method according to the invention.

According to a general embodiment of the present invention, with reference to FIG. 3, a plurality of regular media frames are provided (S0) for transmission. These media frames are typically generated by the application layer by means of known encoding steps in an encoder unit. Robust representations of the provided media frames are also provided and stored (S1) e.g. in a buffer available to the MAC-e entity. At least a subset of the provided regular media frames are transmitted (S2) in a known manner. Upon detecting (S3) an indication of a packet loss or corresponding frame loss the idea is to transmit a stored robust representation of the lost media frame and/or a robust representation of a subsequent, previously not transmitted, provided media frame (S4), thereby improving the overall transmitted quality of the media transmission.

According to a specific embodiment, the locally stored robust representations of the media frames, so called robust media frames, are generally smaller than the normal frames. As an example, the application might use a lower rate voice codec, or could send only voice frames instead of voice and video frames.

Preferably, the locally stored robust mode frames should contain fewer bits than regular or normal frames, as this allows the MAC-e entity to transmit the robust frames with higher probability for a successful transmission without needing to use extra power. Alternatively, in order to enhance the probability of successfully delivering the robust frame, MAC-e entity may transmit it with higher power than the regular frame, or if that is not possible, use more retransmission attempts to deliver the packet. However, if the available MAC-e transmission rate is high enough, it is also possible to use the full original frame, with the possibility to increase the robustness by adapting the rate. One possible way to achieve this is to encode, packetize and store voice frames with two different AMR rates (e.g. AMR 7.95 and 4.75). The frames can be generated by separately encoding the voice samples, or by a single decoding process. The frames need to be stored only long enough for the MAC-e entity to detect a packet loss, typically 20-40 ms (one to two extra retransmission for 2 ms TTI and one for 10 ms TTI respectively), corresponding to not more than one of a few frames. The frames can be packed to the RTP/IP/RLC packets and stored at the MAC-e layer or alternatively the application can just store the robust media frame, and upon receiving a request from the MAC-e, create the required packing.

It is of course possible to configure the MAC-e to make much more than one retransmission, but it is expected that for VoIP only a few transmission attempts will be used to keep jitter and delay at acceptable levels.

Other possible alternatives are to further increase the error resilience of the encoded frame by using application level redundancy or run a completely separate voice codec as a robust mode codec.

The packet loss detection step S3 can be realized according to a plurality of various embodiments. According to a first embodiment, the MAC-e entity detects that the number of retransmissions for a specific packet or frame has reached or even exceeded a predetermined maximum number of retransmissions. This maximum value is signaled to the user equipment with RRC signaling at the E-DCH setup phase.

Another possible packet loss detection embodiment comprises predicting the possibility for packet loss by monitoring the number of received NACKS. If a predetermined number of NACKS have been received for a specific packet or frame, the probability for packet loss is high even if a maximum number of retransmissions has not been exceeded. This could be implemented either by signaling a second limit (retransmission attempts) before utilizing the robust frames.

With reference to FIG. 3, the transmission step S4 according to a further embodiment comprises the initial further step of selecting how to respond to the detected packet loss. When the MAC-e entity detects a packet loss by either of the two previously described methods, or by some other method, a decision concerning the manner in which to improve the quality of the media transmission has to be made. This is typically performed based on an estimate of the available transmission rate by e.g. looking at the current grant and the used power level.

Figure 4:
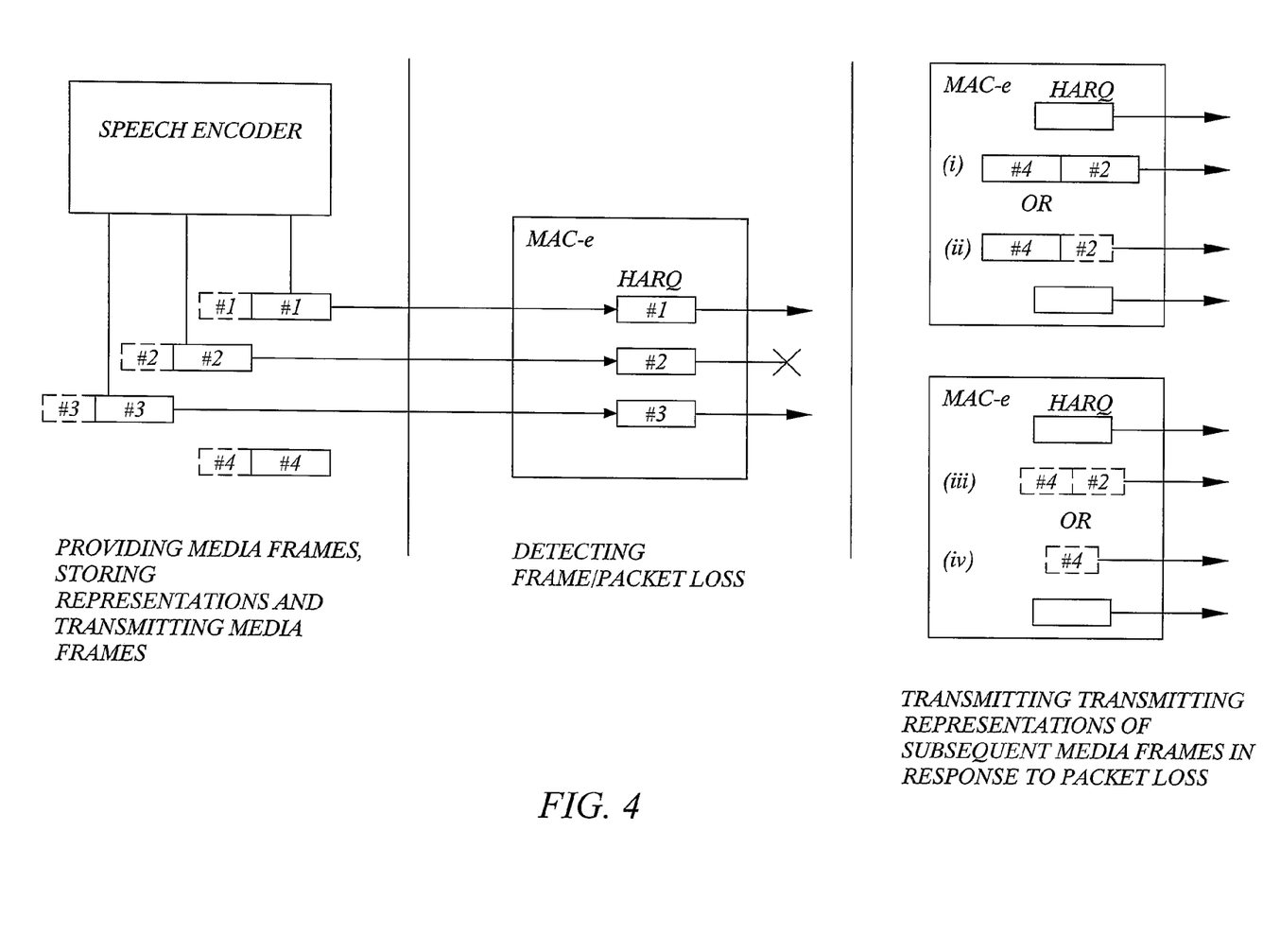
FIG. 4 is a schematic flow diagram of a plurality of embodiments of the present invention.

FIG. 4 illustrates schematically a plurality of the potential embodiments of responding to a detected frame loss indication. A plurality of regular media frames 1, 2, 3, 4 are provided for transmission (as indicated by the solid boxes), also robust representations 1, 2, 3, 4 of the provided media frames are generated and stored (as indicated by the broken boxes). The first three regular frames are transmitted, and an indication of the loss of frame 2 is indicated by the cross. Subsequently, the various embodiments for responding to the detected frame loss indication are illustrated at the far right of the figure, and further described below.

With additional reference to FIG. 4, based on the available transmission rate, the MAC-e entity chooses to respond to the detected packet loss by means of transmitting:
(i) Normal mode media frames for both the subsequent frame and the lost media frames. This normally requires the highest available data rate.
(ii) Normal mode media frame for the subsequent frame and a robust representation of the lost frame.
(iii) Robust media frames for both the subsequent media frame and the lost media frame.
(iv) Robust media frame for the subsequent media frame.

An alternative to the last embodiment (iv) would be to include the further step of estimating which of the two media frames (subsequent or lost) that has the highest priority and only transmit a normal or robust representation of that frame. For example, the evaluation of which frame that has the highest priority may be done by distortion-based marking (a technique that estimates how much distortion that is generated by loss of a packet/frame). Further information on distortion-based marking can be found in the article "*Source-Driven Packet Marking For Speech Transmission Over Differentiated-Services Networks*", Juan Carlos De Martin, IEEE International Conference on Audio, Speech and Signal Processing, Salt Lake City, USA, May 2001.

As previously stated, an alternative embodiment of the method of the present invention is applicable to downlink traffic. One important difference between the downlink and the uplink is that for downlink traffic, the packet loss detection and the media frame generation will occur at different physical nodes.

Accordingly, the media frames are provided (e.g. generated and stored) either in peer UE (for mobile-to-mobile calls) or in a media gateway (for inter-working between CS networks). Similarly to step S1 of the uplink embodiments, it is possible to generate robust frames during the speech encoding process. The robust frames need to be transmitted separately from the normal frames but at the same time as the normal frames. This can be achieved e.g. by using a separate bearer for robust frames.

One further embodiment is to use a special media gateway for mobile-to-mobile calls as well. The function of this media gateway is to generate the robust frames, either simply by duplicating the media frames (or parts of the media frames) or by decoding the media frames, and generating robust frames from the decoded frames.

Both normal and robust frames are preferably buffered at the Node B, which schedules users and performs HARQ retransmissions. Similarly to step S3 of the uplink embodiments, the Node B can detect either directly the packet loss or a high probability for packet loss. Upon detecting a packet loss, it is possible for the Node B to use any of the methods described in step S4 of the uplink traffic.

Figure 5:
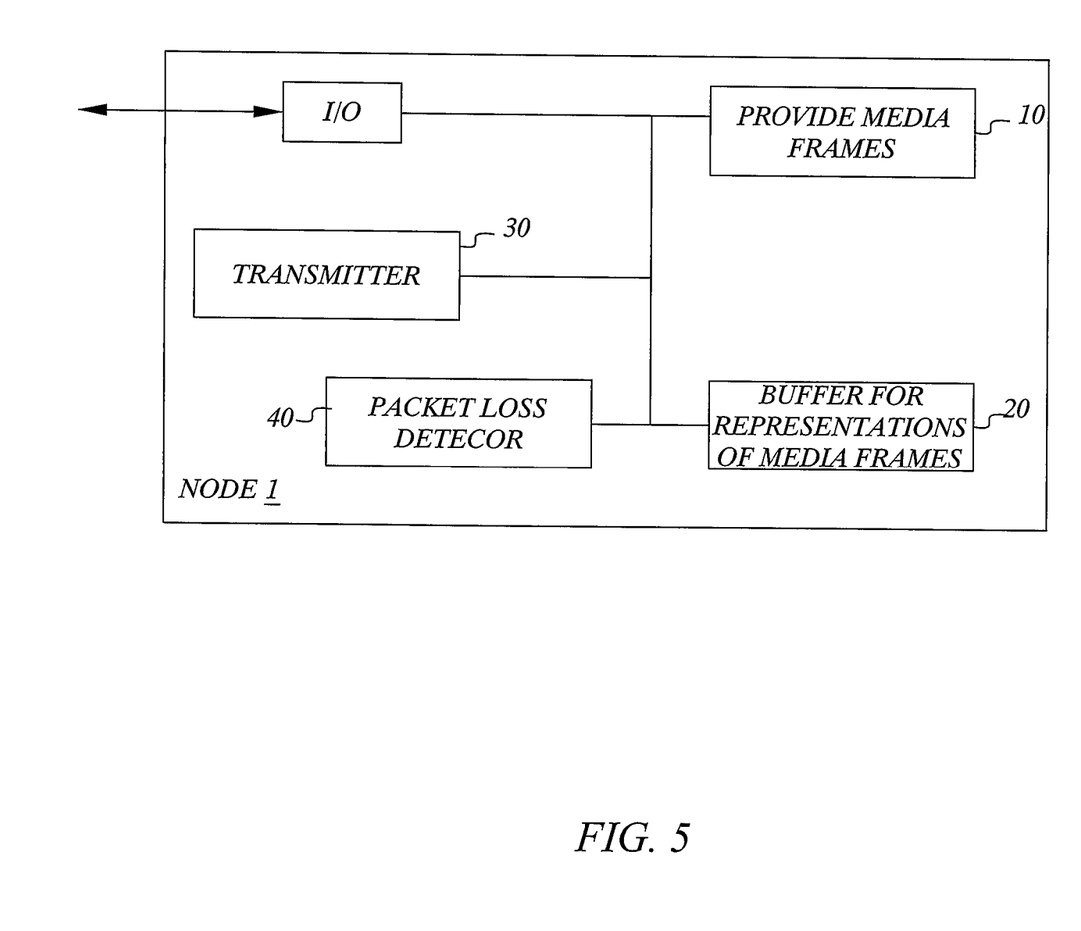
FIG. 5 is a schematic block diagram of an arrangement according to the invention.

With reference to FIG. 5, a system or arrangement for enabling improved media frame transmission quality in response to a detected packet loss comprises the following elements. The system typically comprises a unit for providing media frames 10 for transmission, a buffer unit 20 for generating and locally storing representations of the provided media frames, a transmitting unit 30 for transmitting the provided media frames, or at least a subset of said media frames. Further, the system comprises a detecting unit 40 for detecting a frame or packet loss. Finally, the system comprises a unit for transmitting a stored representation of a subsequently provided but not transmitted media frame in response to a detected packet loss. All units in the system communicate over a common bus in order to exchange data to perform the procedures described further above. According to a preferred embodiment, the unit 30 for transmitting the provided media frames is further adapted to handle also the transmission of the robust representations of the media frames as described previously. However, depending upon the application it might be necessary to provide two separate units for the two types of transmissions, or at least to provide separate bearers for the two.

The robust representations of media frames are likely generated by the application such as a speech encoder and delivered to the transmitting unit. Alternatively, the "transmitter" is responsible for generating the robust frames from the normal frames.

It is also possible to store only the robust frames. For example, it is possible to use a normal frame for the first transmission and then drop that version of the frame and just keep the robust representation for possible "retransmissions". However, as an alternative both the original frames and the robust frames may be stored.

According to a specific embodiment, the arrangement is located in a node in a communication system, e.g. in a user equipment or terminal. However, it is also possible for the various parts of the arrangement to be located in different nodes. Especially, for the case of downlink implementation where the packet loss detection unit 40 and the buffer unit 20 will be located at different nodes. In essence, the media frame representations are then generated at one node, and transmitted and buffered at the Node B It is understood, that also other parts of the arrangement can be implemented at different nodes of the system.

Advantages of the present invention comprise:
The invention enables enhanced conversational media quality over E-DCH, and by allowing operators to use more efficient E-DCH configurations improved system capacity.
An additional embodiment of the invention provides enhanced conversational media quality also over HSDPA in the downlink.

It will be understood by those skilled in the art that various modifications and changes may be made to the present invention without departure from the scope thereof, which is defined by the appended claims.

The invention claimed is:

1. A method of improved media frame transmission in a communication network, comprising:
providing a plurality of consecutive regular media frames for transmission;
providing and storing robust representations of said plurality of consecutive regular media frames;
transmitting at least a subset of said regular media frames;
detecting an indication of a loss of a transmitted media frame,
transmitting, in response to said detected frame loss, at least a stored robust representation of the lost media frame together with a stored robust representation of a subsequent, but not yet transmitted, media frame.

2. The method according to claim 1, comprising transmitting said stored robust representation of the lost media frame together with a subsequent regular media frame.

3. The method according to claim 1, wherein said robust representations are generated in addition to the regular media frames during a media encoding process, and stored in a buffer available to a transmitting unit.

4. The method according to claim 1, comprising the further step of selecting and transmitting said stored robust representation based on an estimate of an available transmission rate.

5. The method of claim 1, wherein said robust representations are smaller than the corresponding regular media frames.

6. The method of claim 1, wherein said step of transmitting a stored robust representation of at least the lost media frame is performed at higher power than an original media frame or if necessary with more retransmission attempts.

7. The method according to claim 1, wherein said detecting step comprises detecting that the number of retransmissions exceed a predetermined limit on maximum number of retransmissions.

8. The method according to claim 1, wherein said detecting step comprises, based on a number of received NACKS, predicting a probability for packet loss exceeding a predefined maximum value.

9. The method according to claim 1, wherein said media frame transmission takes place over E-DCH in the uplink or over HSDPA in the downlink.

10. An arrangement adapted for improved media frame transmission in a communication network, comprising:
means for providing a plurality of consecutive regular media frames for transmission;
means for providing and locally storing robust representations of said plurality of consecutive regular media frames;
means for transmitting at least a subset of said plurality of regular media frames, and
means for detecting an indication of a loss of a transmitted media frame, wherein said transmitting means is further adapted for transmitting, in response to a detected frame loss, at least a stored robust representation of the lost media frame together with a stored robust representation of a subsequent, but not yet transmitted, media frame.

* * * * *

UNITED STATES PATENT AND TRADEMARK OFFICE
CERTIFICATE OF CORRECTION

PATENT NO. : 8,411,697 B2
APPLICATION NO. : 12/278493
DATED : April 2, 2013
INVENTOR(S) : Peisa et al.

It is certified that error appears in the above-identified patent and that said Letters Patent is hereby corrected as shown below:

On the Title Page, item (75), under "Inventors", in Column 1, Line 2,
delete "Lulea (SE);" and insert -- Luleå (SE); --, therefor.

On the Title Page, item (75), under "Inventors", in Column 1, Line 3,
delete "Lulea (SE);" and insert -- Luleå (SE); --, therefor.

In the Drawings

In Fig. 4, Sheet 4 of 5, delete "TRANSMITTING TRANSMITTING" and
insert -- TRANSMITTING --, therefor.

In Fig. 5, Sheet 5 of 5, for Tag "40", Line 2, delete "DETECOR" and
insert -- DETECTOR --, therefor.

In the Specifications

In Column 1, Line 22, delete "3 G-and-beyond," and insert -- 3G-and-beyond, --, therefor.

In Column 1, Line 46, delete "(TTI)" and insert -- (TTI). --, therefor.

In Column 1, Line 47, delete "repeat ReQuest" and insert -- Repeat reQuest --, therefor.

In Column 3, Line 30, delete "request" and insert -- reQuest --, therefor.

In Column 3, Line 53, delete "Access" and insert -- Access. --, therefor.

Signed and Sealed this
Sixteenth Day of July, 2013

Teresa Stanek Rea
*Acting Director of the United States Patent and Trademark Office*

CERTIFICATE OF CORRECTION (continued)
U.S. Pat. No. 8,411,697 B2

In Column 4, Line 49, delete "entity (MAC-e)" and insert -- enhanced (MAC-e) entity --, therefor.

In Column 7, Line 44, delete "B" and insert -- B. --, therefor.

In the Claims

In Column 8, Line 51, in Claim 10, delete "frames," and insert -- frames; --, therefor.